US008833243B2

(12) United States Patent
Sands et al.

(10) Patent No.: US 8,833,243 B2
(45) Date of Patent: Sep. 16, 2014

(54) GRILL INCLUDING AUTOMATIC GAP CALIBRATION

(75) Inventors: Jeffrey L. Sands, Freeport, IL (US);
Robert K. Newton, Beloit, WI (US);
Ronald J. Glavan, Rockton, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 964 days.

(21) Appl. No.: 12/287,941

(22) Filed: Oct. 15, 2008

(65) Prior Publication Data
US 2009/0139411 A1 Jun. 4, 2009

Related U.S. Application Data

(63) Continuation of application No. PCT/US2006/015157, filed on Apr. 20, 2006.

(51) Int. Cl.
*A47J 37/06* (2006.01)
*A47J 27/62* (2006.01)

(52) U.S. Cl.
CPC .................... *A47J 37/0611* (2013.01)
USPC .................. 99/349; 99/379; 99/377; 100/46; 100/258 A; 100/325; 100/326

(58) Field of Classification Search
USPC .................. 99/422, 349, 377, 378, 379, 391; 100/46, 50, 92, 320, 325, 326, 258 A, 100/258 R
See application file for complete search history.

(56) References Cited

U.S. PATENT DOCUMENTS

| 2,328,258 | A | * | 8/1943 | Cannon | 100/46 |
| 3,099,953 | A | * | 8/1963 | Brauer | 100/258 R |
| 3,562,474 | A | * | 2/1971 | Sellmann et al. | 219/69.16 |
| 4,157,066 | A | * | 6/1979 | Pretty | 100/46 |
| 5,910,207 | A | * | 6/1999 | Newton et al. | 99/349 |
| 5,934,182 | A | * | 8/1999 | Harter et al. | 99/349 |
| 6,257,126 | B1 | | 7/2001 | Veljkovic | |
| 6,467,400 | B2 | | 10/2002 | Raio et al. | |
| 6,539,839 | B1 | | 4/2003 | Tippmann | |
| 6,655,267 | B2 | * | 12/2003 | Mukai et al. | 100/258 R |
| 2005/0120889 | A1 | * | 6/2005 | Hill et al. | 99/422 |
| 2005/0193897 | A1 | * | 9/2005 | Nevarez et al. | 99/349 |

OTHER PUBLICATIONS

International Searching Authority, International Search Report and Written Opinion, International Application No. PCT/US06/015157, Jul. 27, 2006.

* cited by examiner

*Primary Examiner* — Reginald L Alexander
(74) *Attorney, Agent, or Firm* — Hinshaw & Culbertson LLP

(57) ABSTRACT

A grill includes a lower platen assembly having a lower grilling surface and a pivotally attached upper platen assembly having an upper grilling surface. The upper platen assembly includes three motors encased in a shell. A cable attached to each motor suspends the upper grilling surface. The grill is automatically calibrated to ensure that the upper grilling surface is level. Each motor independently and sequentially raises the upper grilling surface from the lower grilling surface. When the upper grilling surface lifts from the lower grilling surface, the current in the motor changes. The settings of each motor at this instant are stored in a control to determine the calibration point when the upper grilling surface is level. The grill also automatically recognizes a food item placed on the lower grilling surface to determine the cooking parameters of the grill.

23 Claims, 6 Drawing Sheets

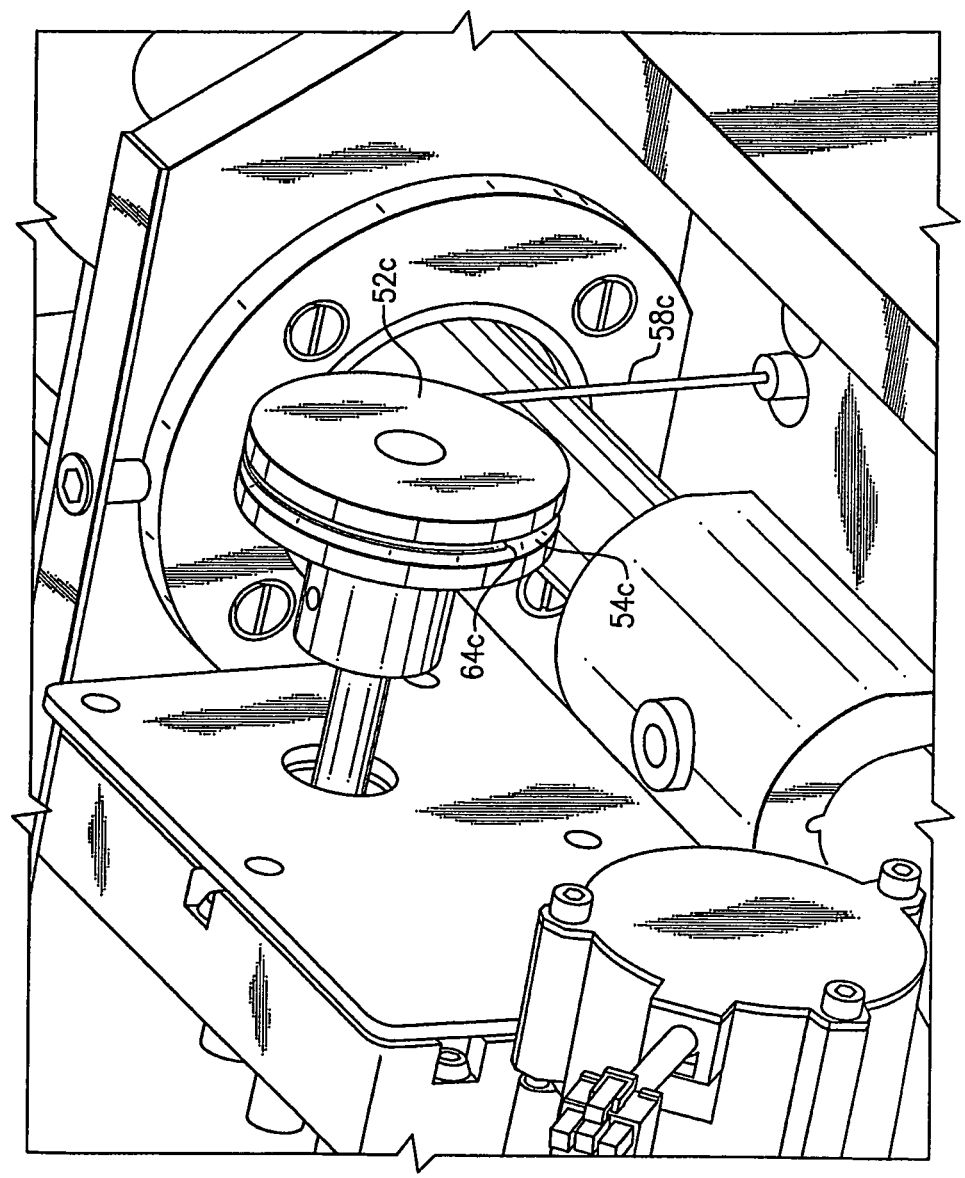

GRILL INCLUDING AUTOMATIC GAP CALIBRATION

CROSS-REFERENCE TO RELATED APPLICATION

This application is a continuation of International Application No. PCT/US2006/015157, with an international filing date of Apr. 20, 2006, now abandoned, the entire disclosure of which is hereby expressly incorporated by reference.

BACKGROUND OF THE INVENTION

The present invention relates generally to a grill that automatically calibrates a gap between an upper grilling surface and a lower grilling surface.

Grills or griddles are used to cook various foods, such as hamburgers. In one prior grill, the sides of the food are grilled separately. The food is placed on a grilling surface, grilling the side of the food that contacts the grilling surface. After that side of the food is cooked, the food is manually flipped to cook the opposite side. After the food is cooked, the food is manually removed from the grill for serving.

In another prior grill, both sides of the food are grilled simultaneously. After manually programming the type of food into a control unit, the food is placed on a lower grilling surface. An upper platen assembly having an upper grilling surface is then lowered onto the food, positioning the food in a gap between the upper and lower grilling surfaces to simultaneously grill both sides of the food. After a predetermined amount of time has passed, the upper platen assembly raises, and the food can be manually removed from the grill.

To ensure optimal performance, the upper grilling surface should be level to ensure that the upper grilling surface uniformly contacts the food. If the upper platen assembly is not level, a service technician must travel to the site to manually calibrate the grill. This requires additional cost and labor.

Hence, there is a need in the art for a grill that automatically calibrates a gap between an upper grilling surface and a lower grilling surface and that overcomes the drawbacks of the prior art.

SUMMARY OF THE INVENTION

A grill includes an upper platen assembly pivotally attached to a lower platen assembly. The lower platen assembly and the upper platen assembly each include a respective grilling surface. When the upper platen assembly is lifted by an operator to a raised position, the lower grilling surface is exposed. Food items are placed on the lower grilling surface by the operator for cooking. The upper platen assembly is pivoted downwardly to a lowered position, positioning the food items in a gap between the lower grilling surface and the upper grilling surface.

The upper platen assembly includes three motors encased in a shell. A control operates and controls the three motors. The motors each operate independently to rotate a shaft including a disc. The upper grilling surface suspends from cables. A first end of each cable is attached to the upper grilling surface, and an opposing second end of each cable is attached to one of the discs.

The grill is automatically calibrated to ensure that the upper grilling surface is level. An operator presses a button to initiate the auto-calibration sequence. The upper grilling surface is lowered to contact the lower grilling surface. One motor is then operated to rotate the shaft, raising a portion of the upper grilling surface. A current sensor detects the current in the motor. When the upper grilling surface is slightly lifted from the lower grilling surface, the current of the motor changes. When the percent change in the current increases over a threshold value, the position of the upper grilling surface and the motor setting are stored in the control. The calibration steps are then repeated.

The calibration steps are then performed by the other two motors individually and sequentially. After the calibrations steps are performed by all three motors, the upper grilling surface is level.

The grill also automatically recognizes a food item placed on the lower grilling surface. An operator presses a button to initiate a cooking cycle. The upper grilling surface lowers towards the lower grilling surface and onto the food items. When the upper grilling surface lifts from the food items on the lower grilling surface, the current in the motors changes. When the current sensor detects that the current changes, the size of the gap between the upper grilling surface and the lower grilling surface is determined, indicating the size of the food item. Based on the size of the food item, the cooking parameters of the grill are determined.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 5 schematically illustrates a perspective view of a disc and a cable of a motor;

DETAILED DESCRIPTION OF THE PREFERRED EMBODIMENT

Figure 1:
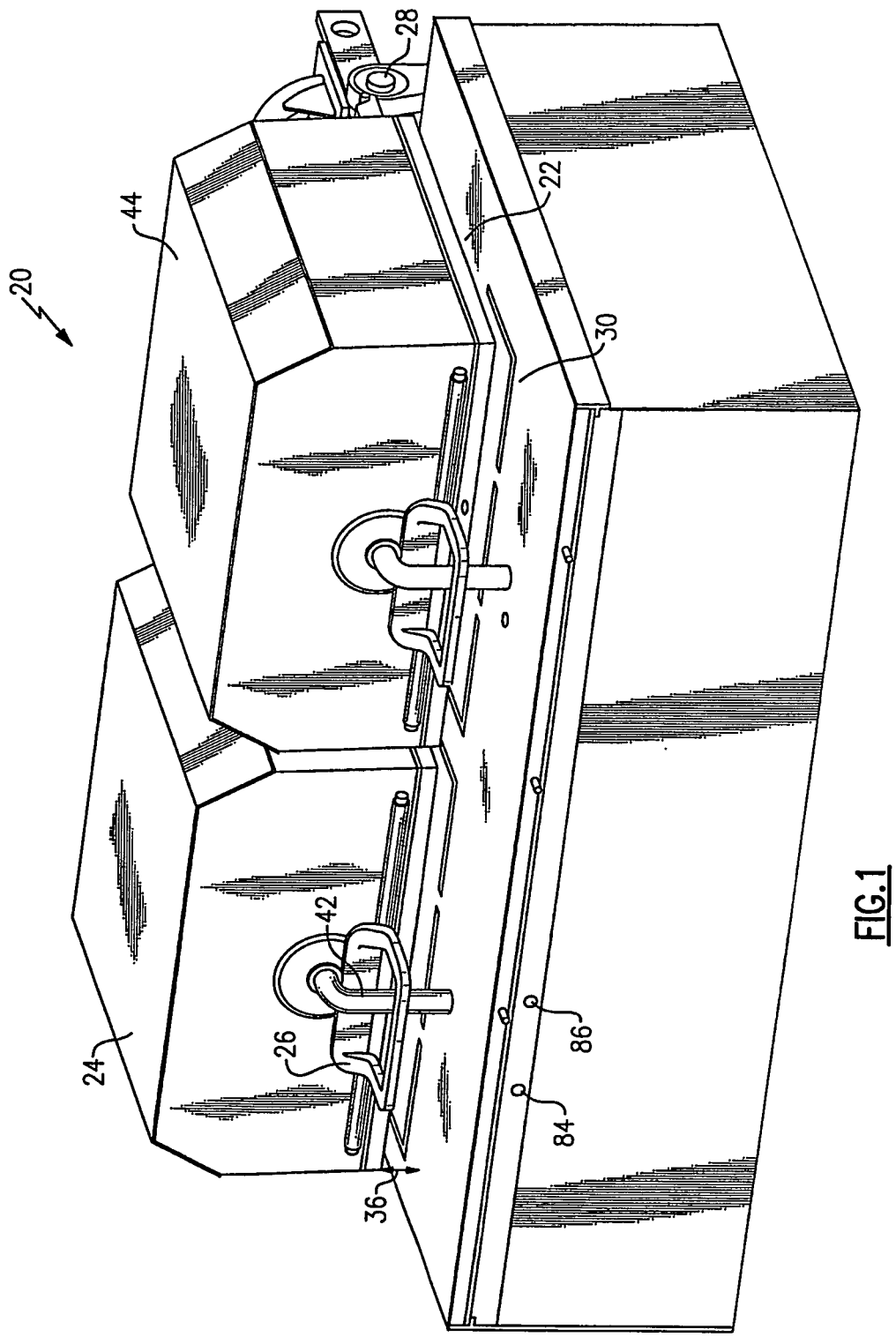
FIG. 1 schematically illustrates a perspective view of a grill of the present invention in a lowered position.
Figure 2:
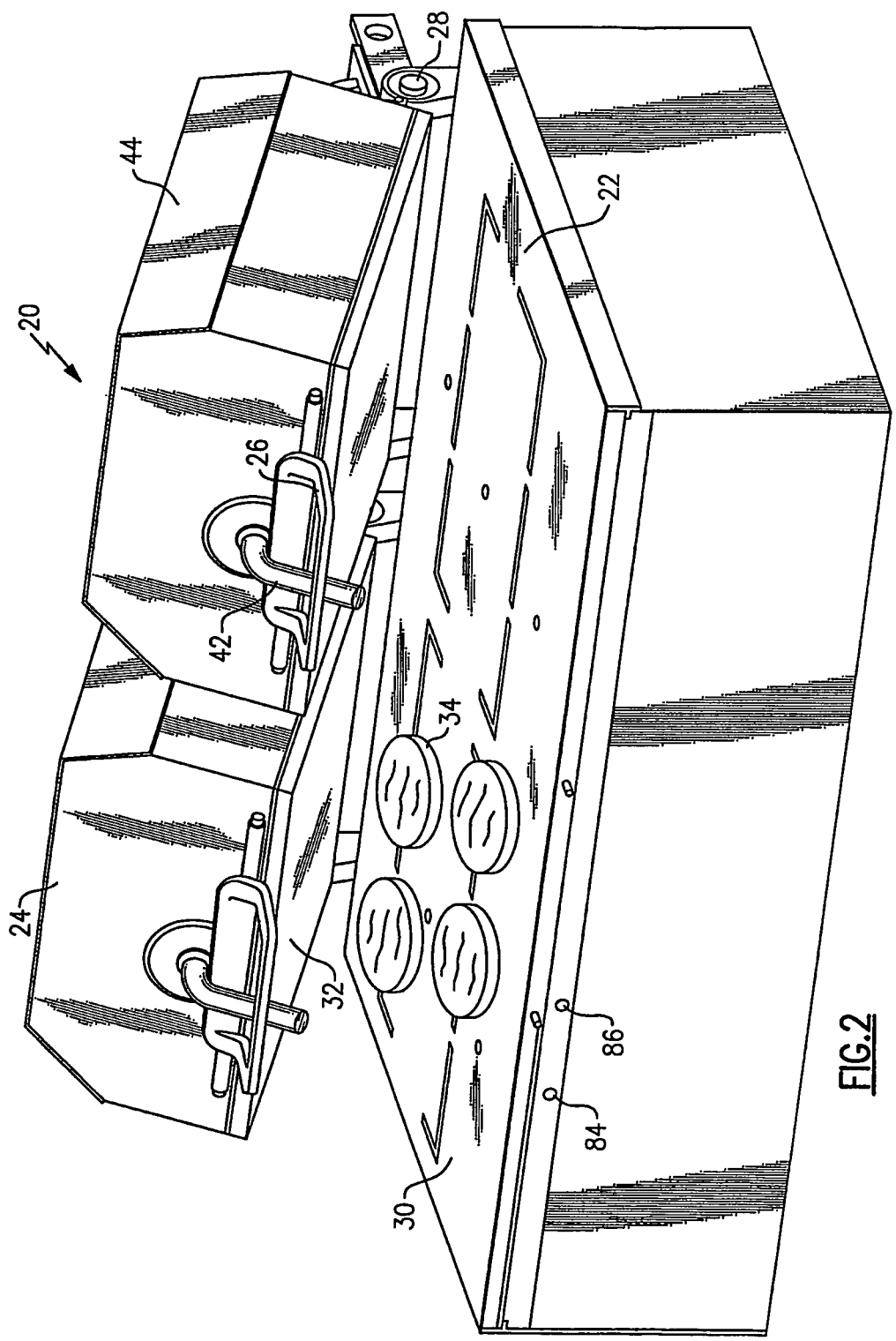
FIG. 2 schematically illustrates a perspective view of the grill in a raised position.

FIGS. 1 and 2 illustrate illustrates a grill 20 in a lowered position and a raised position, respectively. The grill 20 includes a lower platen assembly 22 and an upper platen assembly 24 pivotally attached to the lower platen assembly 22 by a hinge 28. A handle 26 on the upper platen assembly 24 can be grabbed by an operator to pivot the upper platen assembly 24 relative to the lower platen assembly 22 between the lowered position and the raised position. The lower platen assembly 22 and the upper platen assembly 24 each include a respective grilling surface 30 and 32. When the upper platen assembly 24 is lifted by an operator to the raised position, the lower grilling surface 30 is exposed.

Food items 34 are placed on the lower grilling surface 30 by the operator for cooking. In one example, the food items 34 are hamburgers. The operator grabs the handle 26 and pivots the upper platen assembly 24 downwardly to the lowered position, positioning the food item 34 in a gap 36 between the lower grilling surface 30 and the upper grilling surface 32. An arm 42 contacts the lower grilling surface 30 to provide a mechanical stop that defines the gap 36 between the upper grilling surface 32 and the lower grilling surface 30. The grilling surfaces 30 and 32 are heated by a heater (not shown) to cook the food items 34.

Figure 3:
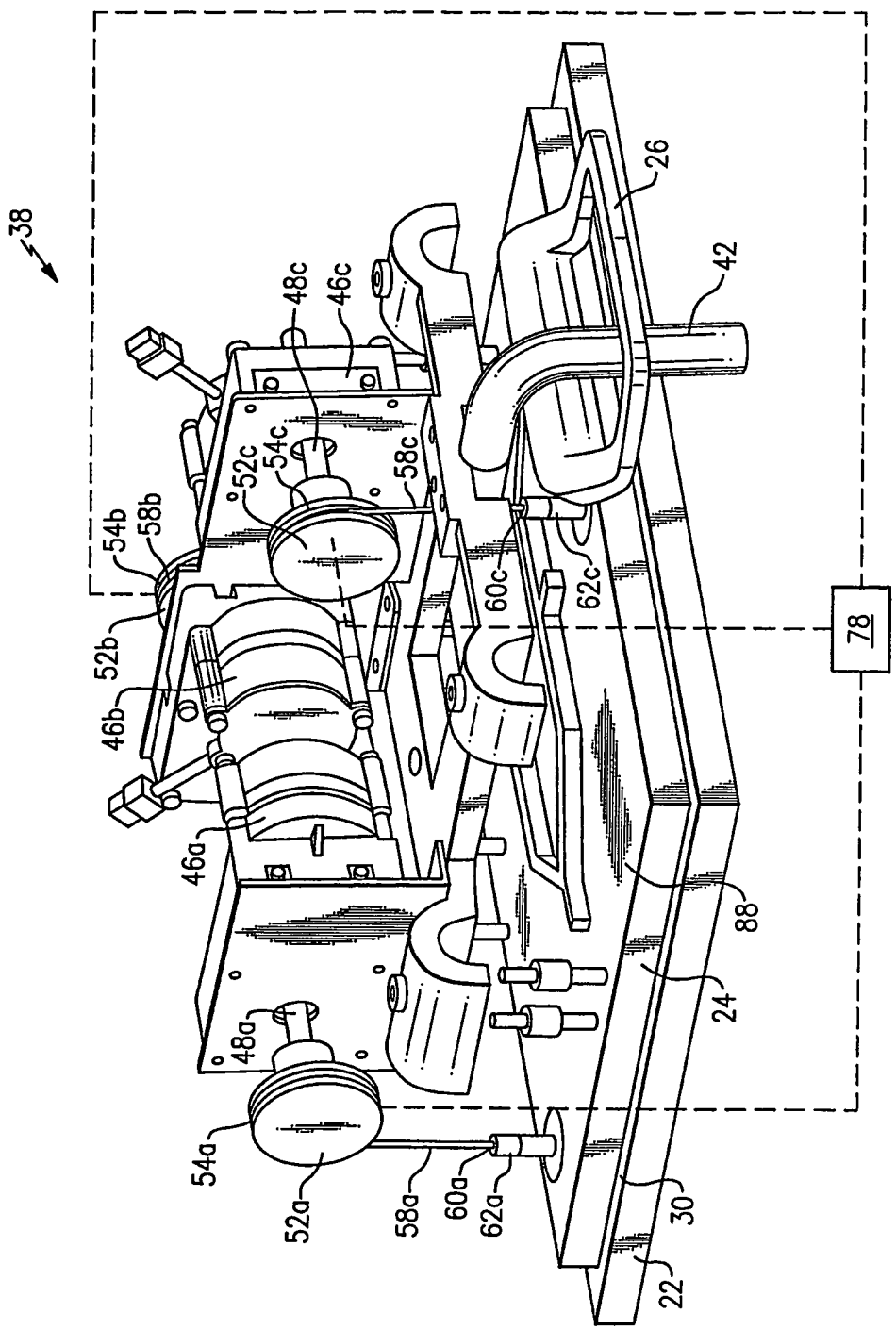
FIG. 3 schematically illustrates a perspective view of the grill in a closed position with a shell removed.
Figure 4:
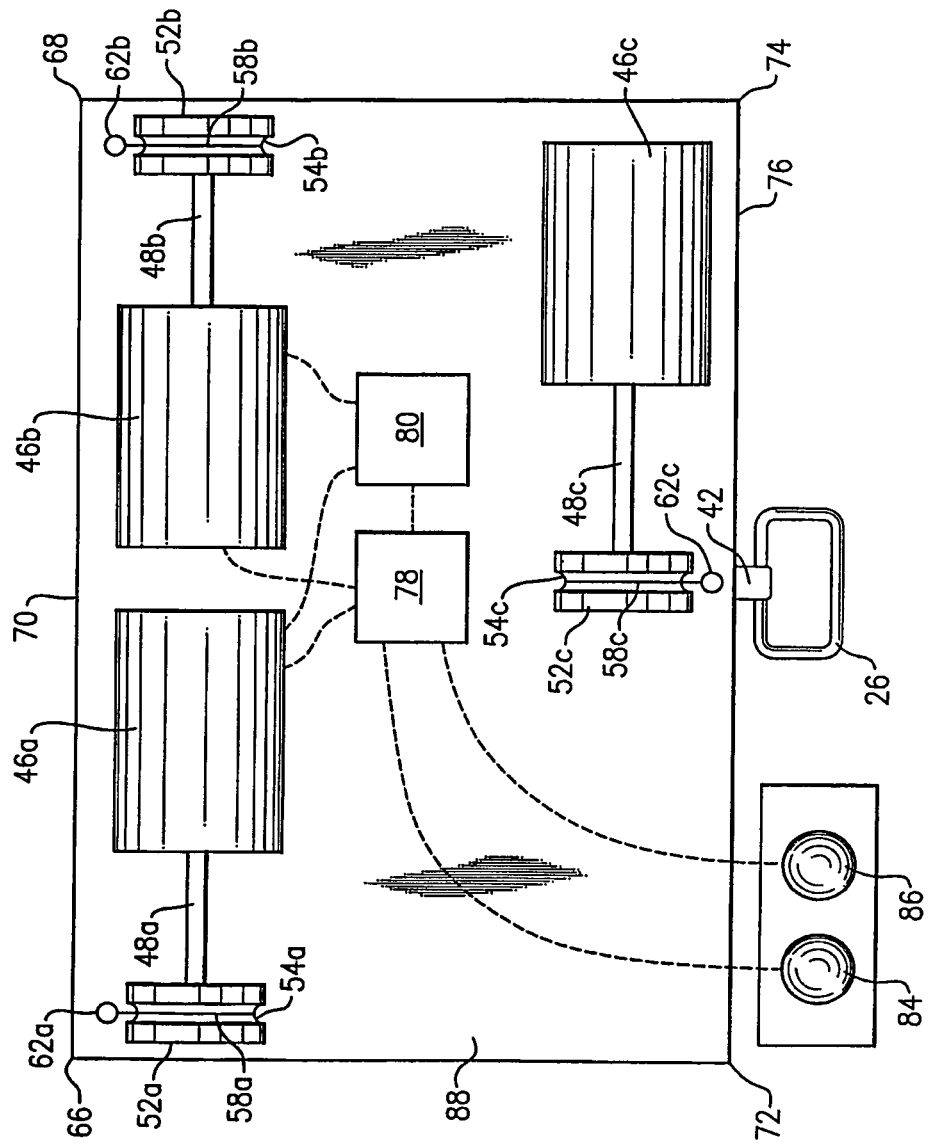
FIG. 4 schematically illustrates a top view of the grill with the shell removed.

As shown in FIGS. 3 and 4, the upper platen assembly 24 includes a leveling mechanism 38 that automatically levels the upper grilling surface 32 relative to the lower grilling surface 30. The leveling mechanism 38 includes three motors 46a, 46b and 46c encased in a shell 44 (shown in FIGS. 1 and 2). Each of the motors 46a, 46b and 46c operate independently to level a portion of the upper grilling surface 32. A control 78 independently controls the three motors 46a, 46b and 46c. Although three motors 46a, 46b and 46c are illustrated and described, it is to be understood that any number of motors 46a, 46b and 46c can be used. The motors 46a, 46b and 46c each operate to rotate a shaft 48a, 48b and 48c, respectively. Each shaft 48a, 48b and 48c rotates a respective disc 52a, 52b and 52c having a respective groove 54a, 54b and 54c.

The upper grilling surface 32 suspends from cables 58a, 58b and 58c. A first end 60a, 60b and 60c of each cable 58a, 58b and 58c, respectively, is attached to an upper surface 88 of the upper grilling surface 32 by an attachment member 62a, 62b and 62c, respectively. As shown in FIG. 5, an opposing second end 64a, 64b and 64c of each cable 58a, 58b and 58c is attached in the grooves 54a, 54b and 54c, respectively, of the disc 52a, 52b and 52c, respectively, such that a portion of each of the cables 58a, 58b and 58c is received in a groove 54a, 54b and 54c, respectively. Although cables 58a, 58b and 58c are illustrated and described, it is to be understood that metal drive belts can be employed.

Returning to FIG. 4, the cable 58a is attached near a first corner 66 of the upper grilling surface 32 with the attachment member 62a, and the cable 58b is attached near a second corner 68 of the upper grilling surface 32 with the attachment member 62b. An edge 70 is located between the first corner 66 and the second corner 68. The third cable 58c is attached to the upper grilling surface 32 with the attachment member 62c at a location between a third corner 72 and a fourth corner 74 of the upper grilling surface 32. In one example, the attachment member 62c is substantially centrally between the third corner 72 and the fourth corner 74. An edge 76 opposite to the edge 70 is located between the third corner 72 and the fourth corner 74. Therefore, the cables 58a, 58b and 58c are attached to the upper grilling surface 32 in a substantially triangular pattern. However, it is understood that any configuration of the cables 58a, 58b and 58c is possible. Each of the motors 46a, 46c and 46c independently move and level a portion of the upper grilling surface 32 that is near the respective attachment members 62a, 62b and 62c.

Figure 7:
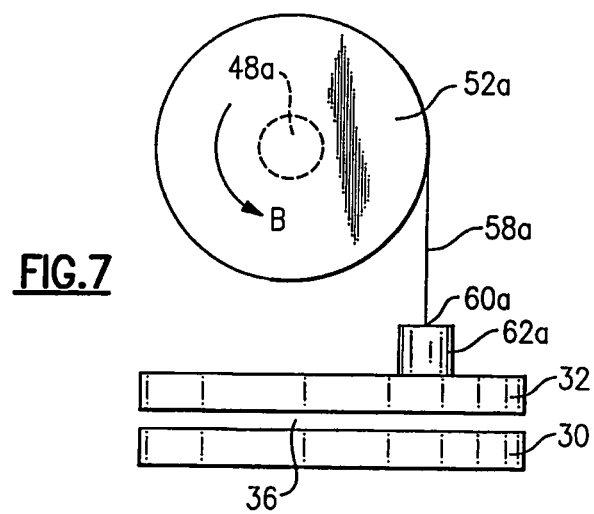
FIG. 7 schematically illustrates a side view of the motor when rotating the disc in a second opposite direction.
Figure 6:
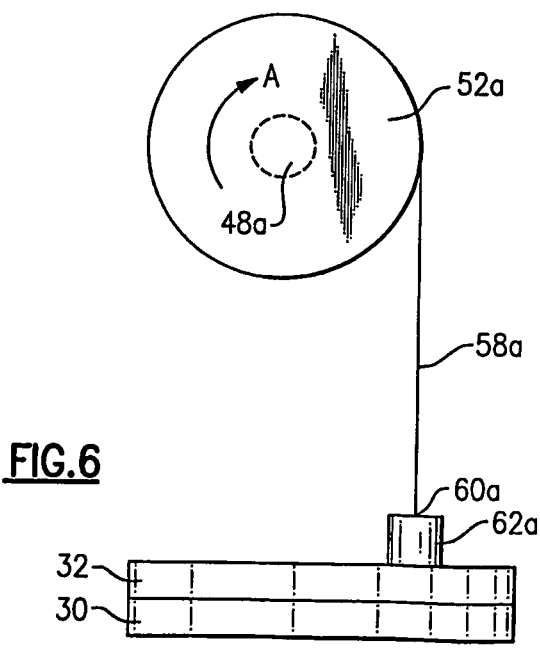
FIG. 6 schematically illustrates a side view of the motor when rotating the disc in a first direction.

As shown in FIG. 6, as the motor 46a rotates the disc 52a in a first direction A, the cable 58a lengthens, lowering the upper grilling surface 32 toward the lower grilling surface 30. As shown in FIG. 7, as the motor 46a rotates the disc 52a in an opposing second direction B, the cable 58a shortens and wraps around the disc 52a, raising the upper grilling surface 32 away from the lower grilling surface 30. Although only the motor 46a, the disc 52a and the cable 58a are illustrated and described, the motors 46b and 46c, the discs 52b and 52c and the cables 58b and 58c operate in a similar manner.

The grill 20 is automatically calibrated to ensure that the gap 36 is maintained at the desired size between the lower grilling surface 30 and the upper grilling surface 32. By calibrated, it is meant that the upper grilling surface 32 is level relative to the lower grilling surface 30 to ensure proper cooking of the food items 34 in the grill 20. In one example, the grill 20 is calibrated daily. If the upper grilling surface 32 becomes unlevel during the day, the calibration steps performed the following day will correct this. However, if the operator notices that the upper grilling surface 32 has become unlevel during use of the grill 20, for example by observing the quality or appearance of the food items 34, the operator can press a button 84 to initiate the auto-calibration sequence, as described below.

When the grill 20 is first used on a given day, an operator presses the button 84 to initiate the auto-calibration sequence that levels the upper grilling surface 32. The button 84 communicates with the control 78. The control 78 sends a signal for the motors 46a, 46b and 46c to rotate the respective shafts 48a, 48b and 48c in the direction A, lengthening the respective cables 58a, 58b and 58c and lowering the upper grilling surface 32 onto the lower grilling surface 30, providing a hard stop for the upper grilling surface 32 and providing slack in the cables 58a, 58b and 58c.

A current sensor 80 detects the current in the windings of each of the motors 46a, 46b and 48c. In one example, the current sensor 80 is a Hall-Effect sensor. However, it is to be understood that any type of sensor can be employed. When the upper grilling surface 32 raises and lifts from the lower grilling surface 30, the weight of the upper grilling surface 32 is transferred from the lower grilling surface 30 to the cables 58a, 58b and 58c. When the cables 58a, 58b and 58c begin to sustain the weight of the upper grilling surface 32, the tension in the cables 58a, 58b and 58c increases and therefore the current in the windings of the motor 46a, 46b and 46c changes.

After the upper grilling surface 32 is lowered onto the lower grilling surface 30, one motor 46a is operated to rotate the shaft 48a in the direction B, wrapping the cable 58a around the disc 52a to shorten and remove any slack in the cable 58a and raise the upper grilling surface 32. As the shaft 48a rotates and the upper grilling surface 32 is lifted, the current of the windings of the motor 46a is detected by the current sensor 80. As the upper grilling surface 32 is lifted, the current is detected at each location of the upper grilling surface 32. When the current sensor 80 detects a change in the current in the windings of the motor 46a, this indicates that the upper grilling surface 32 has lifted from the lower grilling surface 30. When the percent change in the current increases over a threshold level, the settings of the motor 46a and the location of the upper grilling surface 32 are stored in the control 78.

The calibration steps are then repeated. The motor 46a rotates the shaft 48a in the direction A to lower the upper grilling surface 32 onto the lower grilling surface 30. The motor 46a is again operated to rotate the shaft 48a in the direction B, wrapping the cable 58a around the disc 52a to shorten and remove any slack in the cable 58a. The current of the windings of the motor 46a is detected by the current sensor 80. When the percent change in the current increases over a threshold level, the settings of the motor 46a and the location of the upper grilling surface 32 are stored in the control 78 and compared to the settings of the motor 46a and the location of the upper grilling surface 32 previously stored in the control 78. If the settings of the motor 46a and the location of the upper grilling surface 32 match within a given range, these values are stored and indicate the calibration settings of the motor 46a. If the settings of the motor 46a and the location of the upper grilling surface 32 do not match, the calibration steps are repeated until they do match within a given range to settings determined in the previous set of calibration steps. By repeating the calibrating steps more than once, accurate calibration can be ensured.

Although it has been disclosed that the calibration settings of the motor 46a are determined by detecting a percent change in the current over a threshold level, it is to be understood that the calibration settings of the motor 46a can be determined by detecting a specific current or an average current.

The calibration steps performed by the motor 46a are then repeated by the motors 46b and 46c individually and sequentially. Although the motor 46a is described as performing the calibration steps first, it is to be understood that the motors 46a, 46b and 46c can perform the calibration steps in any order. Before each motor 46a, 46b and 46c performs the calibration steps, the upper grilling surface 32 is lowered onto the lower grilling surface 30. After all the motors 46a, 46b and 46c perform the calibration steps, the calibration settings of each of the motors 46a, 46b and 46c that result in the leveling of the upper grilling surface 32 are stored in the control 78. A calibration point of the upper grilling surface 32 is defined when each of the motors 46a, 46b operate in the calibration settings, resulting in the upper grilling surface 32 being level. Alternately, the motors 46a, 46b and 46c are calibrated at the same time.

Additionally, the grill 20 automatically recognizes a food item 34 that is to be cooked in the grill 20. After the food item 34 is placed on the lower grilling surface 30, the operator grabs the handle 26 to lower the upper platen assembly 24 or presses a button 86 to initiate a cooking cycle. The button 86 communicates with the control 78. The control 78 actuates the motors 46a, 46b and 46c to lower the upper grilling surface 32 towards the lower grilling surface 30. The upper grilling surface 32 lowers to a predetermined location and compresses the food items 34 between the upper grilling surface 32 and the lower grilling surface 30 to sear the food items 34.

The motors 46a, 46b and 46c are then operated to rotate the respective shafts 48a, 48b and 48c in the direction B, wrapping the respective cables 58a, 58b and 58c around the respective discs 52a, 52b and 52c to shorten and remove the slack in the cables 58a, 58b and 58c and raise the upper grilling surface 32. As the shafts 48a, 48b and 48c rotate, the current of the windings of the motors 46a, 46b and 46c is detected by the current sensor 80.

When the current sensor 80 detects that the percent change in the current of the windings of the motors 46a, 46b and 46c increases over a threshold level, this indicates that the upper grilling surface 32 has lifted from the food items 34. The control 78 determines the size of the gap 36 between the upper grilling surface 32 and the lower grilling surface 30 based the settings of the motor 46a, 46b and 46c and the calibration point. The size of the gap 36 indicates the size of the food item 34. Based on the size of the food item 34, the cooking parameters of the grill 20 are determined. The cooking parameters are programmed into the control 78. For example, based on the size of the gap 36, the cooking time, the cooking temperature and the size of the gap 36 during cooking of the food items 34 are determined. The control 78 sets the temperature of the heaters on the upper grilling surface 32 and the lower grilling surface 30, the size of the gap 36 between the upper grilling surface 32 and the lower grilling surface 30, and the cooking time. After the cooking time has passed, the upper platen assembly 24 raises, allowing an operator to remove the food items 34 from the lower grilling surface 30.

Alternately, the size of the gap 36 is determined by detecting when the upper grilling surface 32 contacts the food item 34 based on the detected current.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A grill comprising:
    a lower platen assembly including a lower grilling surface;
    an upper platen assembly attached for pivotal movement relative to the lower platen assembly, wherein the upper platen assembly includes an upper grilling surface; and
    a leveling mechanism to automatically level the upper grilling surface relative to the lower grilling surface, wherein the leveling mechanism includes a plurality of motors that each independently move a respective portion of the upper grilling surface to level the upper grilling surface relative to the lower grilling surface;
    each motor operatively connected to a proximal portion of an engaging member, a distal portion of the engaging member operatively connected to the respective portion of the upper grilling surface to transmit substantially only a net force having an upward vertical component tending to raise said respective portion, only when the proximal portion of the engaging member is displaced to an engaging position relative to the vertical position of said respective portion, the proximal portion of the engaging member in the engaging position being movable in a downward direction relative to the respective portion of the upper grilling surface without transmitting force to the upper grilling surface.

2. The grill as recited in claim 1 wherein the leveling mechanism includes a control that independently controls each of the plurality of motors.

3. The grill as recited in claim 1, further comprising a member operatively disposed between each motor and the respective portion of the upper grilling surface, the force transmitted by the motor to said respective portion being transmitted through said member substantially only in tension.

4. The grill as recited in claim 1 further including a button that is pressed by an operator to activate the leveling mechanism to automatically level the upper grilling surface relative to the lower grilling surface.

5. A grill comprising:
    a lower platen assembly including a lower grilling surface;
    an upper platen assembly pivotally attached to the lower platen assembly, wherein the upper platen assembly includes an upper grilling surface; and
    a leveling mechanism to automatically level the upper grilling surface relative to the lower grilling surface, wherein the leveling mechanism includes a plurality of motors that each independently move a portion of the upper grilling surface to level the upper grilling surface;
    wherein each of the plurality of motors includes a rotatable shaft; and
    wherein the leveling mechanism includes a cable associated with each of the plurality of motors having a first end and a second end, wherein the first end of each of the cables is operatively connected to one of the shafts and the second end of each of the cables is attached to the upper grilling surface, wherein the upper grilling surface is suspended from the cables.

6. The grill as recited in claim 5 further including a current sensor that senses current in each of the plurality of motors.

7. The grill as recited in claim 6 further including a control that independently controls each of the plurality of motors,
   wherein, when the leveling mechanism is activated, the plurality of motors lower the upper grilling surface onto the lower grilling surface,
   wherein each of the plurality of motors sequentially raises the portion of the upper grilling surface and the current in each of the plurality of motors changes when the upper grilling surface lifts from the lower grilling surface,
   wherein the current sensor detects a change in the current, and
   wherein calibration settings of each of the plurality of motors when the current sensor detects that the change in the current is over a threshold value are stored in the control to define a calibration point.

8. The grill as recited in claim 6 wherein food is grilled in a gap between the lower grilling surface and the upper grilling surface, the current in each of the plurality of motors changes when the upper grilling surface lifts from the food, the current sensor detects the change in the current, and a size of the gap is determined to recognize the food and determine cooking parameters.

9. The grill as recited in claim 8 wherein the cooking parameters are one of a cooking time, a cooking temperature and a gap distance.

10. The grill as recited in claim 5 wherein the rotatable shaft rotates in a first direction to lengthen each of the cables to lower the upper grilling surface towards the lower grilling surface and the rotatable shaft rotates in an opposing second direction to shorten each of the cables to raise the upper grilling surface relative to the lower grilling surface.

11. The grill as recited in claim 5 wherein the plurality of motors comprise three motors, and the cables are attached to the upper grilling surface in a substantially triangular configuration.

12. A grill comprising:
   a lower platen assembly including a lower grilling surface;
   an upper platen assembly attached for pivotal movement relative to the lower platen assembly, wherein the upper platen assembly includes an upper grilling surface; and
   a leveling mechanism to automatically level the upper grilling surface relative to the lower grilling surface, wherein the leveling mechanism includes:
   a plurality of motors that each independently move a respective portion of the upper grilling surface to level the upper grilling surface relative to the lower grilling surface, wherein each of the plurality of motors includes a rotatable shaft,
   a cable associated with each of the plurality of motors having a first end and a second end, wherein the first end of each of the cables is operatively connected to one of the shafts and the second end of each of the cables is attached to the upper grilling surface, wherein the upper grilling surface is suspended from the cables,
   a control that independently controls each of the plurality of motors, and
   a current sensor that senses current in each of the plurality of motors.

13. The grill as recited in claim 12
   wherein, when the leveling mechanism is activated, the plurality of motors lower the upper grilling surface onto the lower grilling surface,
   wherein each of the plurality of motors sequentially raises the portion of the upper grilling surface and the current in each of the plurality of motors changes when the upper grilling surface lifts from the lower grilling surface,
   wherein the current sensor detects a change in the current, and
   wherein calibration settings of each of the plurality of motors when the current sensor detects that the change in the current is over a threshold value are stored in the control to define a calibration point.

14. The grill as recited in claim 12 wherein food is grilled in a gap between the lower grilling surface and the upper grilling surface, the current in each of the plurality of motors changes when the upper grilling surface lifts from the food, the current sensor detects the change in the current, and a size of the gap is determined to recognize the food and determine cooking parameters.

15. The grill as recited in claim 14 wherein the cooking parameters are one of a cooking time, a cooking temperature and a gap distance.

16. A grill comprising:
   a lower platen assembly including a lower grilling surface;
   an upper platen assembly pivotally attached to the lower platen assembly, wherein the upper platen assembly includes an upper grilling surface; and
   a leveling mechanism to automatically level the upper grilling surface relative to the lower grilling surface, wherein the leveling mechanism includes a plurality of motors that each independently move a respective portion of the upper grilling surface to level the upper grilling surface;
   wherein each motor is operatively connected to a flexible member and configured to shorten and lengthen the flexible member, the flexible member attached to the respective portion of the upper grilling surface, and each flexible member configured to sustain a portion of the weight of the upper platen only when any slack is removed from the flexible member.

17. A grill comprising:
   a lower platen assembly including a lower grilling surface;
   an upper platen assembly attached for pivotal movement relative to the lower platen assembly, wherein the upper platen assembly includes an upper grilling surface; and
   a leveling mechanism to automatically level the upper grilling surface relative to the lower grilling surface, wherein the leveling mechanism includes a plurality of motors that each independently move a portion of the upper grilling surface to level the upper grilling surface;
   each motor operatively engaging the respective portion of the upper grilling surface to enable the motor to transmit force to the respective portion of the upper grilling surface substantially only in an upward direction and to substantially prevent the motor from transmitting force to the respective portion of the upper grilling surface in a downward direction;
   wherein each of the plurality of motors includes a rotatable shaft, wherein a first end of a cable is operatively connected to the shaft, and a second end of the cable is attached to the upper grilling surface.

18. A method of calibrating a grill comprising:
   lowering an upper grilling surface of an upper platen assembly onto a lower grilling surface of a lower grilling assembly; and
   automatically leveling the upper grilling surface relative to the lower grilling surface with a leveling mechanism, wherein the leveling mechanism includes a plurality of motors that each move a portion of the upper grilling surface;

each motor operatively engaging the respective portion of the upper grilling surface to enable the motor to transmit to the respective portion of the upper grilling surface substantially only a net force having an upward vertical component tending to raise said respective portion, wherein the step of automatically leveling the upper grilling surface includes:

supporting at least a portion of the weight of the upper grilling surface with a respective engaging member operatively connected to each motor;

each motor moving its respective engaging member in a first direction to lower the upper grilling surface onto the lower grilling surface until the weight of the upper grilling surface is fully transferred from the engaging members to the lower grilling surface;

each motor moving its respective engaging member farther in the first direction after the weight of the upper grilling surface is fully transferred from the engaging members to the lower grilling surface, without the engaging member applying force to or moving the upper grilling surface; and after moving its respective engaging member farther in the first direction, each motor moving its respective engaging member in a second direction opposite to the first direction, at least until a portion of the weight of the upper grilling surface is transferred from the lower grilling surface to the respective engaging member.

19. A method of calibrating a grill comprising:

lowering an upper grilling surface of an upper platen assembly onto a lower grilling surface of a lower grilling assembly; and automatically leveling the upper grilling surface relative to the lower grilling surface with a leveling mechanism, wherein the leveling mechanism includes a plurality of motors that each move a respective portion of the upper grilling surface;

each motor operatively engaging the respective portion of the upper grilling surface to enable the motor to transmit to the respective portion of the upper grilling surface substantially only a net force having an upward vertical component tending to raise said respective portion, wherein automatically leveling the upper grilling surface includes:

lowering the upper grilling surface onto the lower grilling surface, operating each of the plurality of motors independently and sequentially to raise the portion of the upper grilling surface, detecting a current in each of the plurality of the motors, determining when a change in the current is over a threshold value, storing calibration settings of each of the plurality of motors when the change in the current is over the threshold value, and employing the calibration settings of each of the plurality of motors to determine a calibration point of the upper grilling surface that levels the upper grilling surface relative to the lower grilling surface.

20. The method as recited in claim 19 further including repeating the step of automatically leveling the upper grilling surface for each of the plurality of motors.

21. A method of calibrating a grill comprising:

lowering an upper grilling surface of an upper platen assembly onto a lower grilling surface of a lower grilling assembly; and automatically leveling the upper grilling surface relative to the lower grilling surface with a leveling mechanism, wherein the leveling mechanism includes a plurality of motors that each move a respective portion of the upper grilling surface;

each motor operatively engaging the respective portion of the upper grilling surface to enable the motor to transmit to the respective portion of the upper grilling surface substantially only a net force having an upward vertical component tending to raise said respective portion, placing food on the lower grilling surface, lowering the upper grilling surface onto the food, detecting a change in current when the upper grilling surface lifts from the food, determining a size of a gap between the upper grilling surface and the lower grilling surface when the upper grilling surface contacts the food, and determining cooking parameters based on the size of the gap.

22. The method as recited in claim 21 wherein the cooking parameters are selected from one or more of cooking time, cooking temperature and gap distance.

23. A method of calibrating a grill comprising the steps of:

lowering an upper grilling surface of an upper platen assembly onto a lower grilling surface of a lower grilling assembly; and automatically leveling the upper grilling surface relative to the lower grilling surface with a leveling mechanism, wherein the leveling mechanism includes a plurality of motors that each move a respective portion of the upper grilling surface;

wherein the step of automatically leveling the upper grilling surface includes operating each of the motors to move a flexible member, the flexible member attached to the respective portion of the upper grilling surface, to remove any slack from the flexible member so that the flexible member sustains a portion of the weight of the upper platen.

* * * * *